United States Patent
Rockenfeller et al.

(10) Patent No.: US 6,282,919 B1
(45) Date of Patent: Sep. 4, 2001

(54) AUXILIARY ACTIVE MOTOR VEHICLE HEATING AND AIR CONDITIONING SYSTEM

(75) Inventors: Uwe Rockenfeller, Boulder City, NV (US); Lance Kirol, Wolcott, VT (US); Paul Sarkisian; Kaveh Khalili, both of Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/357,145

(22) Filed: Jul. 20, 1999

(51) Int. Cl.$^7$ ................................................ F25B 17/08
(52) U.S. Cl. ............................ 62/480; 62/324.2; 62/476
(58) Field of Search .................................. 62/480, 324.2, 62/112, 476

(56) References Cited

U.S. PATENT DOCUMENTS

| | | |
|---|---|---|
| Re. 34,259 | 5/1993 | Rockenfeller et al. . |
| 2,241,600 | 5/1941 | Hunsicker . |
| 2,537,720 | 1/1951 | Wagner . |
| 4,292,285 | 9/1981 | Ron et al. . |
| 4,507,263 | 3/1985 | Ron . |
| 4,623,018 | 11/1986 | Takeshita et al. . |
| 4,906,258 | 3/1990 | Balat et al. . |
| 5,161,389 | 11/1992 | Rockenfeller et al. . |
| 5,165,247 | 11/1992 | Rockenfeller et al. .................. 62/77 |
| 5,186,020 | 2/1993 | Rockenfeller et al. . |
| 5,263,330 | 11/1993 | Rockenfeller et al. . |
| 5,271,239 | 12/1993 | Rockenfeller et al. . |
| 5,283,219 | 2/1994 | Mauran et al. . |
| 5,298,231 | 3/1994 | Rockenfeller . |
| 5,328,671 | 7/1994 | Rockenfeller . |
| 5,384,101 | 1/1995 | Rockenfeller . |
| 5,408,847 | 4/1995 | Erickson ................................ 62/478 |
| 5,440,899 | 8/1995 | De Beijer et al. ..................... 62/480 |
| 5,441,716 | 8/1995 | Rockenfeller . |
| 5,447,706 | 9/1995 | Van Weynberg et al. . |
| 5,477,706 | 12/1995 | Kirol et al. ............................. 62/480 |
| 5,518,069 | * 5/1996 | Maier-Laxhuber et al. .... 165/104.12 |
| 5,598,721 | 2/1997 | Rockenfeller et al. ................ 62/480 |
| 5,650,030 | 7/1997 | Kyricosq ............................... 156/192 |
| 5,768,904 | 6/1998 | Tagamolila et al. ................. 62/238.3 |
| 5,901,572 | * 5/1999 | Peiffer et al. .......................... 62/480 |
| 5,901,780 | * 5/1999 | Zeigler et al. . |
| 5,953,927 | * 5/1999 | Tagamolila et al. ................. 62/238.3 |

FOREIGN PATENT DOCUMENTS

| | | |
|---|---|---|
| 0 800 863 A1 | 10/1997 | (EP) . |
| 380446 | 9/1932 | (GB) . |
| WO 97/16685 | 5/1997 | (WO) . |

* cited by examiner

Primary Examiner—William Doerrler
Assistant Examiner—Melvin Jones
(74) Attorney, Agent, or Firm—Knobbe, Martens, Olson & Bear, LLP

(57) ABSTRACT

An auxiliary active heating and air conditioning system for a passenger area of a motor vehicle comprising a heat exchanger in the passenger area piped to receive conditioned heat transfer fluid, a sorption cooling system located outside the passenger area and having first and second reactors, each reactor containing a metal salt or a complex compound formed by absorbing a polar gas on a metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide, the reactors having a heat transfer section for thermally exposing a heat transfer fluid and/or condensed polar gas refrigerant in heat exchange communication with the metal salt or said complex compound, a refrigerant loop including an evaporator piped to deliver conditioned heat transfer fluid to the heat exchanger during air conditioning, a heater for heating heat transfer fluid, and a valve assembly comprising one or more valves for directing heat transfer fluid heated by the heater. In a preferred embodiment each reactor contains a sorbent/substrate composition comprising a substrate material inert to the polar gas and incorporating the salt or the complex compound.

47 Claims, 7 Drawing Sheets

AUXILIARY ACTIVE MOTOR VEHICLE HEATING AND AIR CONDITIONING SYSTEM

BACKGROUND OF THE INVENTION

In U.S. Pat. No. 5,901,780, a sorption system configured to operate continuously when the vehicle is not running is disclosed. The system comprises a heat exchanger in the passenger area piped to receive conditioned heat transfer fluid, a sorber cooling system located outside the passenger area and having two sorber beds, each of sufficient capacity to meet the cooling requirements of the passenger compartment for a predetermined interval, and piped to be alternately operated at duty cycle corresponding to the predetermined interval where one bed is absorbing and the other bed is desorbing to drive refrigerant around a refrigerant loop, the refrigerant loop including an evaporator for delivering conditioned heat transfer fluid to the heat exchanger during air conditioning (cooling), a fuel fired heater outside the passenger area and of sufficient thermal capacity to desorb a single sorber bed during the predetermined interval, and one or more valves for directing heat transfer fluid heated by the fuel fired heater. The system operates in a heating mode wherein a heat transfer fluid heated by the fuel fired heater is directed to the heat exchanger, and a cooling mode wherein heat transfer fluid heated by the fuel fired heater is alternately directed to the respective sorber beds for refrigerant absorption and desorption. The sorption system and method of operation disclosed in the aforesaid U.S. Pat. No. 5,901,780 is incorporated herein by reference.

SUMMARY OF THE INVENTION

The improved auxiliary heating and air conditioning system of the present invention comprises the system described in the aforesaid patent and utilizes solid-vapor sorption reactors containing a complex compound formed by absorbing a polar gas, preferably ammonia, on a metal salt. In a preferred embodiment, the reactors contain a substrate material incorporating the metal salt or complex compound. Complex compounds incorporating ammonia are capable of absorbing large amounts of the refrigerant, as well as having high reaction rates. By using a sorbent/substrate composition incorporating the metal salt or the complex compound as disclosed hereinafter, the reactors of the system offer improved performance and life expectancy.

DETAILED DESCRIPTION OF THE PREFERRED EMBODIMENTS

Figure 1:
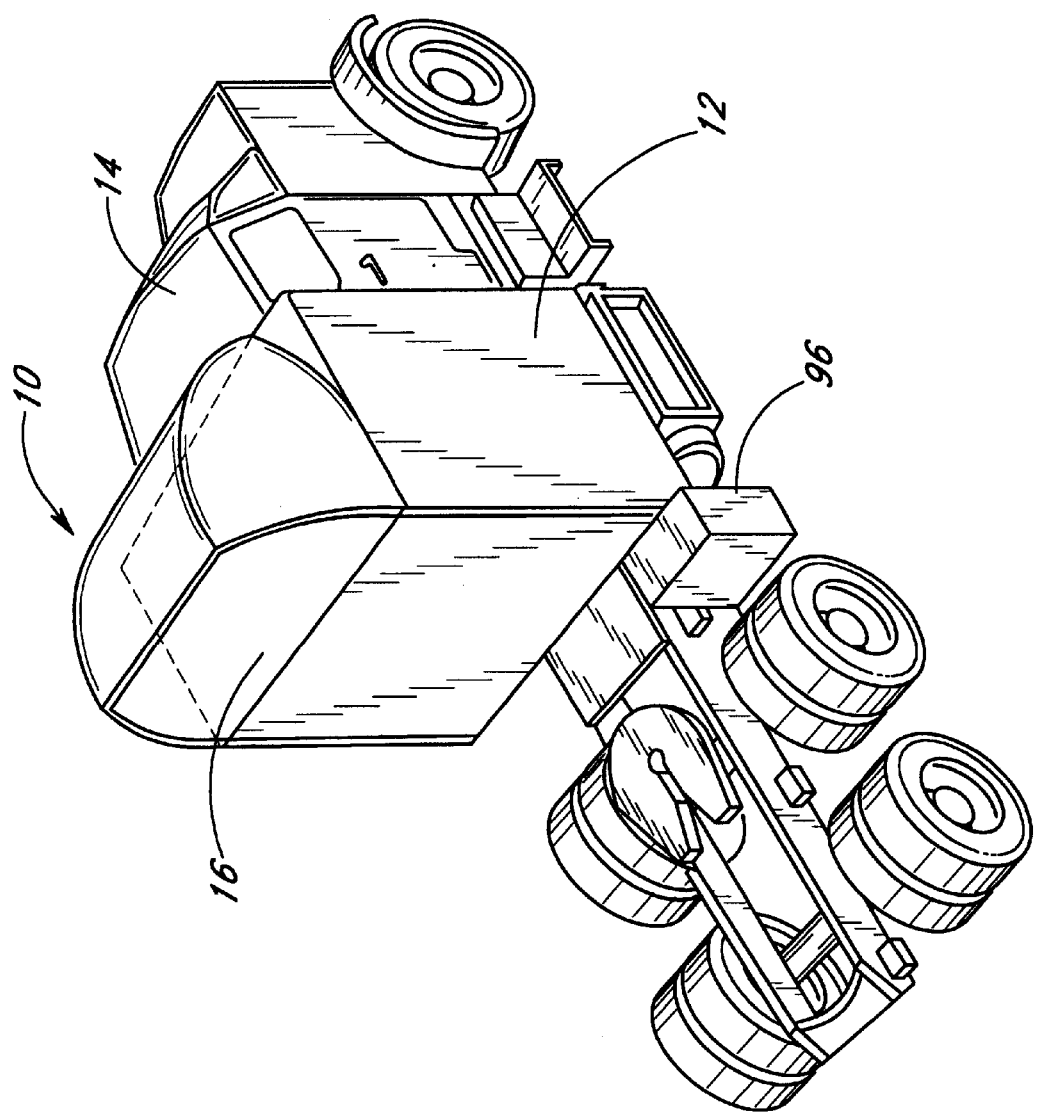
FIG. 1 is a view of a tractor of a tractor-trailer vehicle having a passenger area partitioned into cab and bunk areas illustrating application of the present invention.

FIG. 1 shows a tractor 10 of a tractor-trailer vehicle. The tractor portion 10 of the tractor trailer vehicle includes an interior space that defines a passenger compartment 12 which includes a cab area 14 and a bunk or sleeper area 16. The bunk or sleeper area can be used by the driver of the Vehicle 10 for periodic rest breaks during long runs. During operation of the vehicle 10, the passenger compartment 12 is generally heated and cooled by a primary heating and air conditioning system powered by the engine (not shown) of the tractor 10. In a heating mode, the hot engine coolant is piped to a heat exchanger in the passenger compartment. In cooling, the engine drives a compressor which compresses and drives refrigerant around a conventional air conditioning circuit which has an evaporator coil in the passenger compartment. During the driver's rest breaks, it is desirable to be able to shut down the engine of the tractor 10 in order to save fuel, reduce engine wear, and limit environmental pollution. The heating and air conditioning system of the present invention is auxiliary and active in nature in that it has an independent power source capable of continuously supplying heating and air conditioning to the passenger compartment 12 of the tractor-trailer vehicle 10 for prolonged periods, even while the engine is shut-down. Although the system is shown and described in connection with the passenger compartment of a tractor-trailer vehicle, it may be used for heating and air conditioning the passenger compartment of any type of motor vehicle including tractor-trailer vehicles, cars, trucks, campers, motor homes, buses, recreational vehicles, certain boats, and small airplanes or any area of a motor vehicle where passengers may be located, such as, for example, the passenger compartment of a tractor trailer vehicle, just the sleeper area of the passenger compartment of a tractor trailer vehicle, the living area of a camper, motor home, or recreational vehicle, and the living and sleeping quarters of certain boats.

In the following description, the terms absorption and adsorption are used interchangeably to refer to the sorption reaction between a polar gas and a metal salt to form a coordinative complex compound as disclosed herein. The heating and air conditioning system of the invention incorporates and utilizes solid-vapor sorption reactors containing a complex compound formed by absorbing a polar gas on a metal salt. The complex compounds are those disclosed in U.S. Pat. No. Re. 34,259 incorporated herein by reference. During the absorption reaction the volumetric expansion of the complex compound formed is restricted as described in U.S. Pat. Nos. 5,298,231, 5,328,671 and 5,441,716, the descriptions of which are incorporated herein by reference. The preferred polar gaseous reactants are ammonia, water, lower alkanols ($C_1$–$C_5$), alkylamines, and polyamines. Sulfur dioxide, pyridine and phosphine may also be used. Ammonia is most preferred. Preferred metal salts include the nitrates, nitrites, perchlorates, oxalates, sulfates, sulfites and halides, particularly chlorides, bromides and iodides of alkali metals, alkaline earth metals, transition metals, particularly chromium, manganese, iron, cobalt, nickel, copper, tantalum and rhenium, as well as zinc, cadmium, tin and aluminum. Double metal chloride or bromide salts, in which at least one of the metals is an alkali or alkaline earth metal, aluminum, chromium, copper, zinc, tin, manganese, iron, nickel or cobalt are also useful. Another salt of special interest is $NaBF_4$. Other useful complex compounds are disclosed in U.S. Pat. Nos. 5,186,020 and 5,263,330 the descriptions of which are incorporated herein by reference. Preferred complex compounds used in the reaction of the invention are the following or comprise adsorption/desorption compositions containing at least one of the following as a component. Although in the following complex compounds, numerical values of moles of ammonia ("X") per mole of salt are given, in some complexes, the mole range given comprises several coordination steps. For example, in the case of $NaBF_4$ compounds, a number of different reaction steps occur between the numerical limits given. Typically however, practical considerations only allow for use of a portion of the designed coordination range. Accordingly, the following ranges are intended to be approximate as will be understood by those skilled in the art.

| Complex Compound | X Value |
|---|---|
| $SrCl_2.X(NH_3)$ | 0–1, 1–8 |
| $CaCl_2.X(NH_3)$ | 0–1, 1–2, 2–4, 4–8 |
| $ZnCl_2.X(NH_3)$ | 0–1, 1–2, 2–4, 4–6 |
| $ZnBr_2.X(NH_3)$ | 0–1, 1–2, 2–4, 4–6 |
| $ZnI_2.X(NH_3)$ | 0–1, 1–2, 2–4, 4–6 |
| $CaBr_2.X(NH_3)$ | 0–1, 1–2, 2–6 |
| $CoCl_2.X(NH_3)$ | 0–1, 1–2, 2–6 |
| $CoBr_2.X(NH_3)$ | 0–1, 1–2, 2–6 |
| $CoI_2.X(NH_3)$ | 0–2, 2–6 |
| $BaCl_2.X(NH_3)$ | 0–8 |
| $MgCl_2.X(NH_3)$ | 0–1, 1–2, 2–6 |
| $MgBr_2.X(NH_3)$ | 0–1, 1–2, 2–6 |
| $MgI_2.X(NH_3)$ | 0–2, 2–6 |
| $FeCl_2.X(NH_3)$ | 0–1, 1–2, 2–6 |
| $FeBr_2.X(NH_3)$ | 0–1, 1–2, 2–6 |
| $FeI_2.X(NH_3)$ | 0–2, 2–6 |
| $NiCl_2.X(NH_3)$ | 0–1, 1–2, 2–6 |
| $NiBr_2.X(NH_3)$ | 0–1, 1–2, 2–6 |
| $NiI_2.X(NH_3)$ | 0–2, 2–6 |
| $SrI_2.X(NH_3)$ | 0–1, 1–2, 2–6, 6–8 |
| $SrBr_2.X(NH_3)$ | 0–1, 1–2, 2–8 |
| $SnCl_2.X(NH_3)$ | 0–2.5, 2.5–4, 4–9 |
| $SnBr_2.X(NH_3)$ | 0–1, 1–2, 2–3, 3–5, |
| $BaBr_2.X(NH_3)$ | 0–1, 1–2, 2–4, 4–8 |
| $MnCl_2.X(NH_3)$ | 0–1, 1–2, 2–6 |
| $MnBr_2.X(NH_3)$ | 0–1, 1–2, 2–6 |
| $MnI_2.X(NH_3)$ | 0–2, 2–6 |
| $CaI_2.X(NH_3)$ | 0–1, 1–2, 2–6, 6–8 |
| $CrCl_2.X(NH_3)$ | 0–3, 3–6 |
| $LiCl.X(NH_3)$ | 0–1, 1–2, 2–3, 3–4 |
| $LiBr.X(NH_3)$ | 0–1, 1–2, 2–3, 3–4 |
| $NaCl.X(NH_3)$ | 0–5 |
| $NaBr.X(NH_3)$ | 0–5.25 |
| $NaBF_4.X(NH_3)$ | O.5–2.5 |
| $NaI.X(NH_3)$ | 0–4.5 |
| $K_2FeCl_5.X(NH_3)$ | 0–5, 5–6, 6–11 |
| $K_2ZnCl_4.X(NH_3)$ | 0–5, 5–12 |
| $Mg(ClO_4)_2.X(NH_3)$ | 0–6 |
| $Mg(NO_3)_2.X(NH_3)$ | 0–2, 2–4, 4–6 |
| $Sr(ClO_4)_2.X(NH_2)$ | 0–6, 6–7 |
| $CrBr_3.X(NH_3)$ | 0–3 |
| $CrCl_2.X(NH_3)$ | 0–3, 3–6 |
| $VCl_3.X(NH_3)$ | 0–3, 3–5, 5–6, 6–7, 7–12 |
| $AlCl_3.X(NH_3)$ | 0–1, 1–3, 3–5, 5–6, 6–7, 7–14 |
| $CuSO_4.X(NH_3)$ | 0–1, 1–2, 2–4, 4–5 |

Especially preferred are any of the $CaCl_2.X(NH_3)$ complexes, $SrCl_2.1$–8 $(NH_3)$, $SrBr_2.2$–8 $(NH_3)$, $CaBr_2.2$–6 $(NH_3)$, $CaI_2.2$–6 $(NH_3)$, $FeCl_2.2$–6 $(NH_3)$, $FeBr_2.2$–6 $(NH_3)$, $FeI_2.2$–6 $(NH_3)$, $CoCl_2.2$–6 $(NH_3)$, $CoBr_2.2$–6 $(NH_3)$, $BaCl_2.0$–$8(NH_3)$, $MgCl_2.2$–6 $(NH_3)$, $MgBr_2.2$–6 $(NH_3)$, $MnCl_2.2$–6 $(NH_3)$ and $MnBr_2.2$–6 $(NH_3)$, and mixtures of two or more thereof.

Preferred reactors used in the systems incorporate the improvements disclosed in U.S. application Ser. No. 09/304,763 filed May 4, 1999, incorporated herein by reference. More specifically the space between heat exchange surfaces of the reactor are substantially filled with a sorbent/substrate composition comprising a substrate material that incorporates the metal salt or a complex compound produced from the metal salt and a polar gas. The substrate material incorporating the metal salt or complex compound may be a woven material such as a fabric or cloth, an unwoven material such as felt, mat or similar material in which the strands or fibers have been tangled or otherwise mixed, twisted, pressed or packed to form a coherent substrate. Woven fabric layers may be used between unwoven layers of fibers, especially in composites of alternating woven and unwoven fiber layers. Yarn, rope, or strips or ribbons of substrate fabric may also be used for certain rector heat exchanger designs.

Specific preferred substrate materials include nylon polymers including nonaromatic nylons or polyamides, aromatic polyamides or aramids, fiberglass, and polyphenylene sulfides. The aramids are preferred for complex compounds operating at reaction temperatures below about 150° C. For higher temperatures, fiberglass and polyphenylene sulfides are preferred, while at temperatures below about 120° C., nylon-based polymer materials are also suitable. Aramids are not recommended at reaction temperatures above about 150° C. Substrate materials having a high thermal conductivity are advantageous since they improve heat transfer properties of the heat exchanger sorber core. The thermal conductivity of aforesaid substrate materials may be enhanced by incorporating highly thermal-conductive materials such as fibers, particulates, etc. into the substrate.

To obtain high thermodynamic and mass efficiency of the substrate composition, it is desirable to use a physical form of the material which can be loaded with a high mass fraction of the sorbent. It is preferable that at least 50%, and preferably 70%, and most preferably 85% or more, of the volume of the sorbent/substrate composition comprises the sorbent itself. Thus, a preferred substrate material used to produce the sorbent/substrate composition of the invention has a porosity of about 50% or more and up to about 98. Examples of types of fabric used to meet such open volume and porosity requirements include textile materials such as cloth, fabric, felt, mat, etc., commonly formed by weaving or knitting, as well as non-woven but cohesive forms such as batt or batting and the like. It has been found advantageous to use a substrate material sufficiently gas permeable for the refrigerant gas to pass through and sufficiently low in pore size to prevent small salt particles to penetrate. Although woven materials usually provide superior physical and structural uniformity, the use of non-woven or amorphous fiber substrates may provide for more uniform distribution of solid sorbent throughout the pores, spaces and interstices of the material.

The sorbent is incorporated in the substrate material by embedding or impregnating or otherwise combining the two components to form the sorbent/substrate composition to be installed in a sorber heat exchanger according to the invention. The preferred method of incorporating the sorbent into the substrate material is by impregnation. Such impregnation is carried out by any suitable means such as spraying the substrate material with a liquid solution, slurry, suspension or mixture containing the sorbent or soaking the substrate in a liquid solution, slurry or suspension of the sorbent followed by removal of the solvent or carrier by drying or heating, and/or by applying a vacuum. Yet, other method for incorporating sorbent into the substrate include embedding or otherwise distributing fine sorbent particles within the substrate using blowing, blasting or sintering methods and techniques. Moreover, the particles may be directed into or combined with the substrate material at the time the substrate felt or fabric is manufactured, or subsequently. The sorbent may also be melted, for example, as a hydrate, and the liquid sorbent applied to the substrate after or during substrate manufacture. It may be preferred to impregnate the substrate with the absorbent prior to installation in the reactor. However, the substrate may also be installed prior to being impregnated with the solution containing the absorbent salt.

The mass diffusion path of the reactors is the distance a gas molecule must travel between the gas distribution surface and the absorbent particle. The specific description and definition of the mass diffusion path length is disclosed in U.S. Pat. No. 5,441,716 and is incorporated herein by reference. In reactors using ammonia as the refrigerant and ammoniated complex compounds, the mean maximum mass diffusion path is preferably below about 15 mm, which corresponds to the preferred mean mass diffusion path length described in the aforesaid incorporated patent. Optimum dimensions are a function of the specific sorbents and refrigerants used in the process, and the operating pressures, approach pressures and temperatures as well as the sorbent loading density and of the substrate material gas permeability. Preferred mean mass diffusion path lengths are below about 15 mm and most preferred are below about 12 mm. The thermal diffusion or thermal path length is dependent on the distance between adjacent heat exchange surfaces, more specifically, the distance from the nearest highly thermally conductive surface to the center of the absorbent mass. For example, for a reactor of the type illustrated in FIG. 7, the thermal path length is one-half of the distance between adjacent fins. Preferably, the thermal path length is less than 4.5 mm, more preferably less than 4 mm and most preferably about 3.0 mm or less. Thus, for finned tube heat exchanger designs, such a thermal path length is equivalent to a reactor fin count of at least four fins per inch of the length (height) of the reactor module. Preferred reactor fin counts are between about 9 and 25 fins per inch (1.4 mm to 0.5 mm thermal path length).

The heat exchanger sorber core may be further improved by use of highly thermal conductive materials such as metals or carbon fibers. The incorporation of such materials or additives in the substrate materials will allow the use of finned tube heat exchangers having a lower fin count or less fins per inch than otherwise disclosed in the aforementioned patents. Thus, substrate fabric or felt may contain, in its woven structure, thermally conductive metal, carbon or graphite fiber or particles. The use of such thermally conductive materials is particularly suitable and even preferable where the substrate material is of relatively low thermal conductivity. For example, glass fiber, known for its low thermal conductivity, will be substantially improved by incorporating such thermally conductive fibers.

Figure 2:
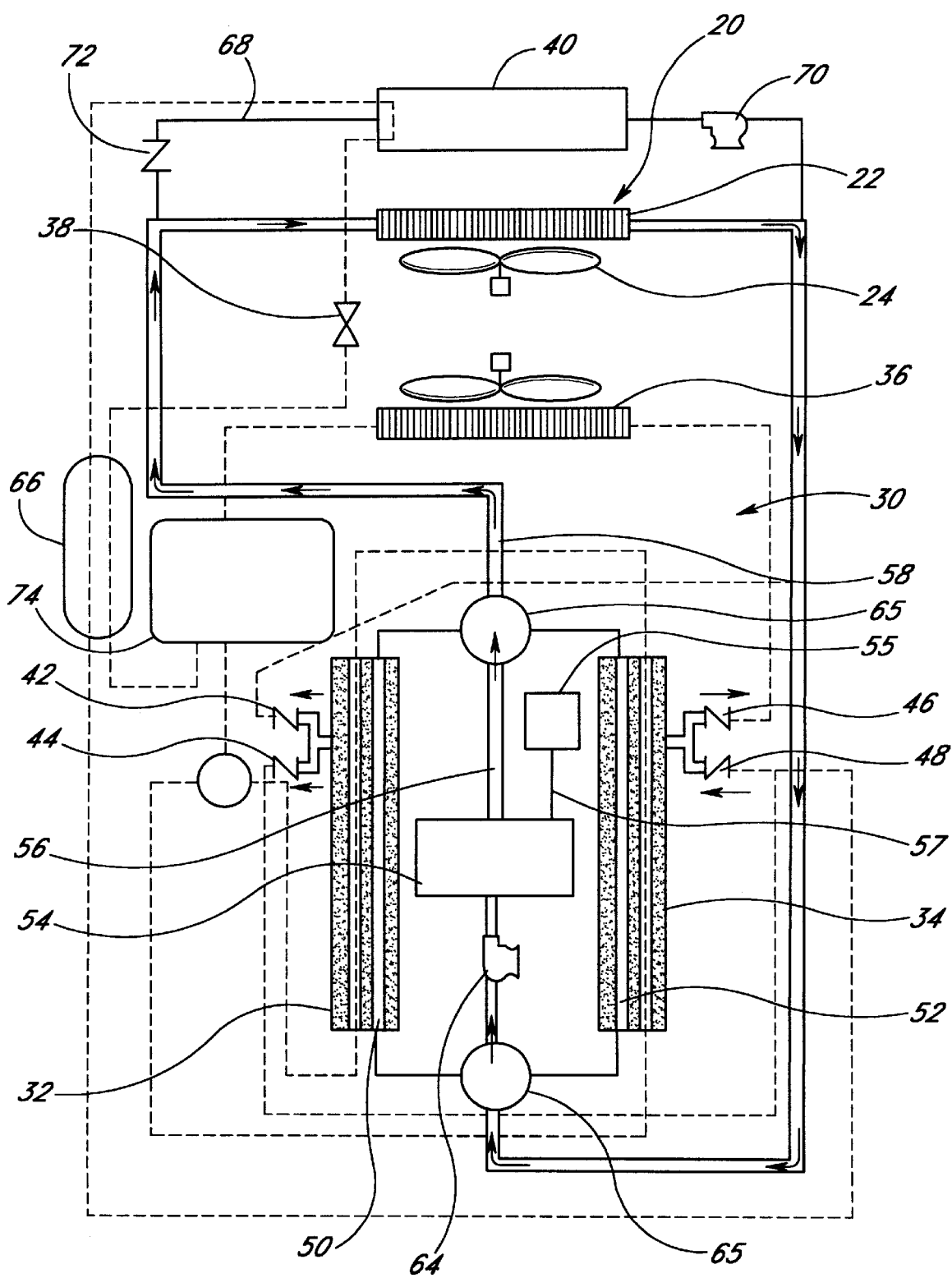
FIG. 2 is a schematic illustration of a two sorber auxiliary active heating and air conditioning system of the present invention showing the system operating to provide heating.
Figure 3:
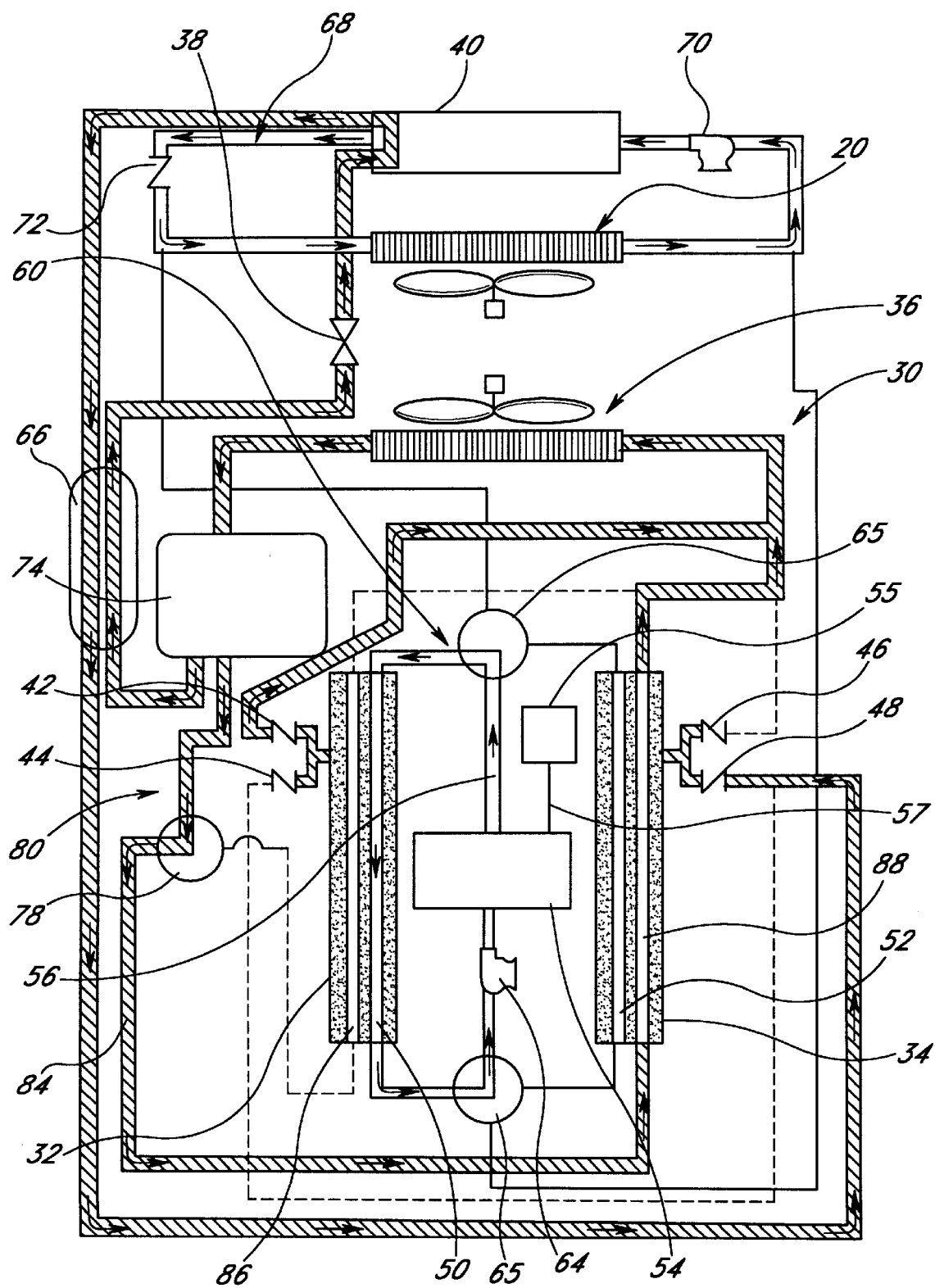
FIG. 3 is a schematic illustration of the two sorber auxiliary active heating and air conditioning system of the present invention operating to provide cooling with the left sorber desorbing.
Figure 4:
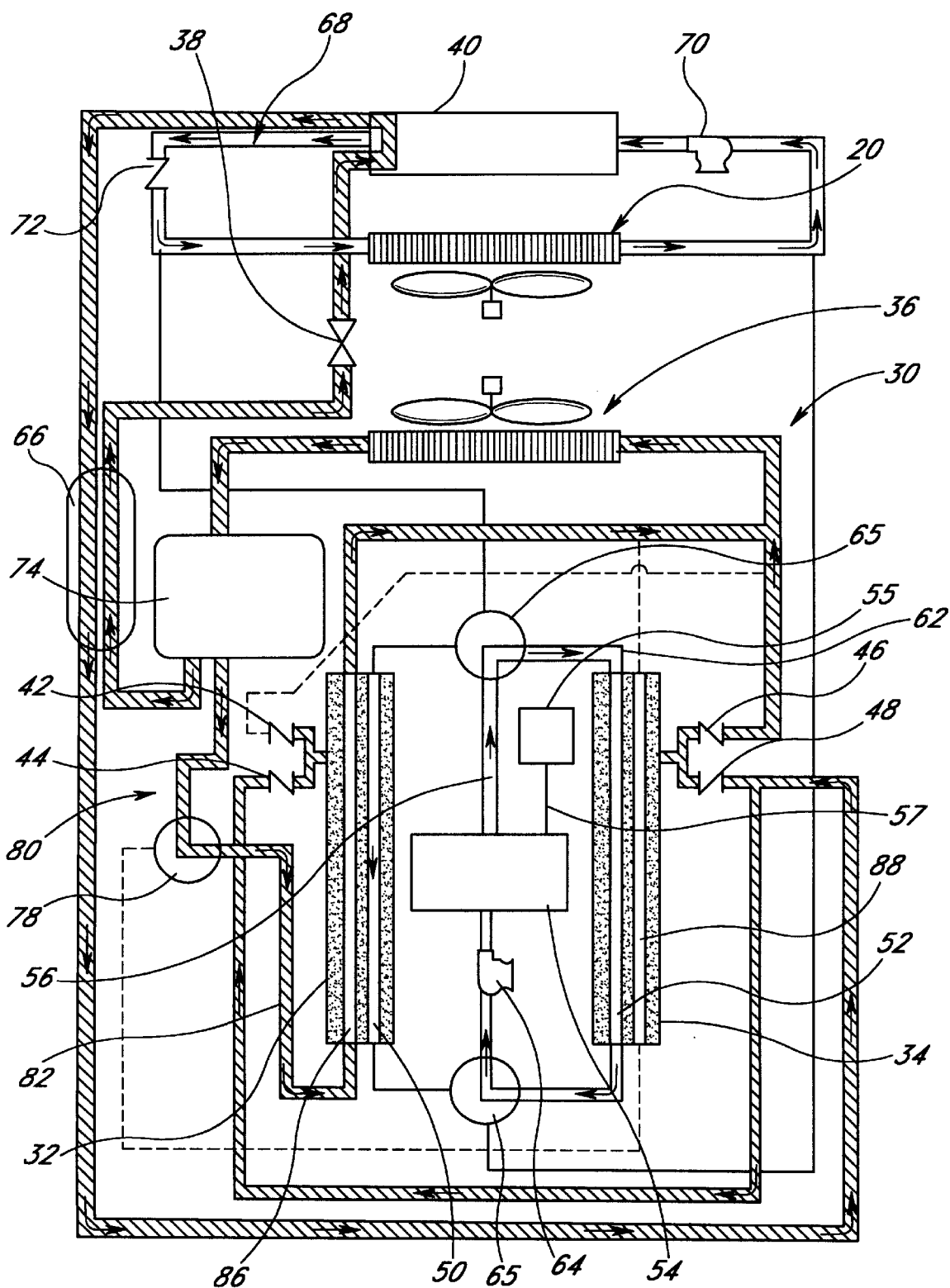
FIG. 4 is a schematic illustration of the two sorber auxiliary active heating and air conditioning system of the present invention operating to provide cooling with the right sorber desorbing.

Referring to FIGS. 2–4, a heating and air conditioning system constructed according to the present invention is schematically illustrated. The illustrated heating and air conditioning system is capable of operating in a plurality of modes and is adapted to selectively supply heated or cooled air to the passenger compartment 12 of the tractor 10 via a single heat exchanger 20 in the passenger compartment 12. The illustrated heat exchanger 20 includes a coil 22 having a passage through which heat transfer fluid can circulate. The heat transfer fluid that circulates through the coil 22 has been "conditioned" by the auxiliary heating and air conditioning system such that it is either heated heat transfer fluid or cooled heat transfer fluid. The thermal energy of the conditioned heat transfer fluid may be transferred from the coil 22 to the passenger or sleeper areas 12, 16 through convection by a blower 24 which directs air flow across the coil 22. Thus, unlike conventional heating and air conditioning systems for motor vehicles which typically have separate heating and air conditioning heat exchangers in a common air plenum and utilize dampers to direct air over one or the other or a mix of both, the present system only requires a single heat exchanger for both heating and air conditioning thereby reducing the weight, space, and cost requirements of the present system.

In order to power the heating and air conditioning of the passenger compartment, the auxiliary heating and air conditioning system includes a power source that operates independently of the engine of the tractor-trailer vehicle. In the preferred embodiment, the power source comprises a fuel fired heater 54 that has a passage 56 through which heat transfer fluid can be circulated and heated. The fuel fired heater 54 operates from a fuel source 55 which is located on board the tractor-trailer vehicle 10 and is connected to the heater by a fuel line 57. For both heating and air conditioning, the fuel fired heater 54 drives the system by providing heated heat transfer fluid, with heating being produced by directing this heated heat transfer fluid directly to the heat exchanger 20 and air conditioning being produced by directing the heat transfer fluid to a sorption cooling system.

The system shown in FIGS. 2–4 utilizes two absorbers, i.e. a two reactor cooling system. A two reactor cooling system is operated by alternately heating one of the reactors while the other reactor cools. The reactor being heated desorbs refrigerant from a refrigerant loop while the cooling reactor adsorbs refrigerant from the loop thereby causing refrigerant to be driven around the loop. The roles of the two reactors are switched at a predetermined interval whereby the sorber cooling system can continuously supply air conditioning. While the sorber system of the present invention is described as having two reactors, those skilled in the art will appreciate that each "reactor" may comprise a bank of two or more reactors. Thus, a two reactor system can include 4, 6, or more reactors so long as a first bank of reactors and a second bank of reactors are alternately heated and cooled. Moreover, cycle improvements can also be obtained by sequential operation or time shifted operation of absorbers within each bank of reactors, and may also include an uneven number of absorbers within each bank.

The illustrated sorber air conditioning system has a closed refrigerant loop 30 that includes first and second reactors 32, 34, a condenser 36, a flow device such as an expansion valve 38, and an evaporator 40. The refrigerant loop also includes check valves 42, 44, 46, 48 which facilitate the flow of refrigerant through the loop 30 during the desorption and adsorption of the reactors 32, 34. The first and second reactors 32, 34 each include an independent passage 50, 52, respectively, through which heat transfer fluid can circulate in order to heat the reactor for desorption.

The fuel fired heater 54 is specially configured to have sufficient thermal capacity to power the auxiliary heating and air conditioning system during both the summer and winter. More particularly, during the summer, the fuel fired heater 54 must be capable of heating the heat transfer fluid to an adequate temperature to cause the desorption/adsorption process in the reactors, and it must have sufficient thermal capacity to complete the desorption/adsorption process before the end of the predetermined interval. Moreover, the fuel fired heater 54 must have sufficient capacity to meet the heating requirements of the passenger compartment 12 during the winter. For example, with a typical sleeper area in a passenger compartment, an auxiliary heating and air conditioning system should be able to produce at least 2000 BTU/hr of cooling energy during the summer and more than 4000 BTU/hr of heating energy during the winter. For such a system, where ammonia is used as the refrigerant and conventional vehicle engine coolant is the heat transfer fluid, a fuel fired heater capable of heating the heat transfer fluid to 270° F. and producing a minimum of 7500 BTU/hr should be provided. Such a system would produce 2000 BTU/hr of cooling air at a temperature of 55° F. in the summer and 7500 BTU/hr of heating air at a temperature of 150° F. in the winter, would have a volume of less than 4.5 cubic feet and a weight of approximately 150 lbs.

The system shown in FIGS. 2–4 also includes a heat transfer fluid circulatory system that selectively interconnects the heat transfer fluid passage 56 in the heater 54 with either the heat transfer fluid passage in the first reactor 32, the second reactor 34, or the heat exchanger 20. The heat transfer fluid circulatory system includes at least three independent heat transfer fluid paths. A first path 58 that circulates heat transfer fluid between the heater 54 and the heat exchanger 20 (best shown in FIG. 2), a second path 60 that circulates heat transfer fluid between the heater 54 and the first reactor 32 (best shown in FIG. 3), and a third path 62 that circulates heat transfer fluid between the heater 54 and the second reactor 34 (best shown in FIG. 4). As shown in FIGS. 2–4, in order to facilitate the circulation of the heat transfer fluid, the system includes a pump 64 which is positioned such that it can drive the heat transfer fluid through any of the three paths. It will be appreciated that any type of heat transfer fluid could be used in the heat transfer fluid circulatory system including water or a mixture of water and an antifreeze such as ethylene glycol or propylene glycol.

The system illustrated includes valve assembly 65 for directing the heated heat transfer fluid which is produced by the heater 54 such that the heater can be used to power both the heating and the air conditioning. The valve assembly 65 is operable in at least a heating mode and cooling mode. In the heating mode, heat transfer fluid heated by the fuel fired heater 54 is directed as conditioned heat transfer fluid to the heat exchanger. In the cooling mode, heat transfer fluid heated by the fuel fired heater 54 is alternately directed at the predetermined interval to the respective reactors. In the illustrated embodiment, the valve assembly 65 comprises a multi-directional valve located adjacent the outlet of the fuel fired heater which receives heated heat transfer fluid and directs it to either the first, second, or third heat transfer fluid paths 58, 60, 62. The illustrated valve assembly 65 also includes a second multi-directional valve adjacent the inlet to the fuel fired heater 54 which, while not necessarily controlling the direction of the flow of the heat transfer fluid from the heater 54, interrupts the backflow of heat transfer fluid into the reactors 32, 34 during heating, and into the heat exchanger 20 and the adsorbing reactor during air conditioning.

In the schematic drawings of the auxiliary heating and air conditioning system, the active portions of the heat transfer fluid circulatory system (i.e. those containing circulating fluid) are depicted as double solid lines with arrows indicating the direction of the flow while the inactive portions are drawn as solid single lines. Similarly, the active portions of the refrigerant circulatory system are drawn as thick cross hatched lines with arrows indicating the direction of flow while the inactive portions are drawn as dashed lines.

During heating, the heated heat transfer fluid from the heat transfer fluid passage 56 of the fuel fired heater 54 is directed to the heat exchanger 20 in the passenger compartment 12 via the valve assembly means 65. As shown schematically in FIG. 2, during the heating mode, heat transfer fluid circulates through the first fluid path 58 such that heated heat transfer fluid from the output of the fuel fired heater 54 circulates through the heat exchanger 20 in the passenger compartment. In the heat exchanger 20, the thermal energy of the heated heat transfer fluid is transferred to the passenger compartment via the blower 24. During the heating mode, the refrigerant in the refrigerant loop 30 is not circulating and the second and third heat transfer fluid paths 60, 62 which circulate heat transfer fluid from the heater 54 through the first and second reactors 32, 34 respectively are interrupted or shut off.

During air conditioning, the first heat transfer fluid path 58 which circulates heated heat transfer fluid through the heat exchanger 20 is interrupted and the heated heat transfer fluid from the heater 54 is alternately circulated via the valve assembly means 65 through the first and second reactors 32, 34 heating one reactor while the other cools. FIG. 3 schematically illustrates the heat transfer fluid flow and the refrigerant flow during the half cycle where the first reactor 32 is heated and the second reactor 34 is cooling. Similarly, FIG. 4 schematically illustrates the heat transfer fluid flow and the refrigerant flow during the half cycle where the second reactor 34 is heated and the first reactor 32 is cooling.

Referring to FIG. 3, the valve assembly 65 is directing heat transfer fluid to circulate in the second heat transfer fluid path 60 that interconnects the fuel fired heater 54 and the first reactor 32 while the heat transfer fluid paths 58, 62 are interrupted or shut off. During the half cycle of the cooling mode illustrated in FIG. 3, check valves 42 and 48 are open and check valves 44 and 46 are closed. As the heated heat transfer fluid is circulated through the heat transfer fluid passage 50 in the first reactor 32 bed via the pump 64 the thermal energy in the fluid is transferred to the sorbent composition in the reactor. As the sorbent composition is heated, the vapor pressure of the sorbent composition increases until it is greater than the condenser pressure, at which time the sorbent composition begins to desorb refrigerant vapor to the condenser via refrigerant loop 30. While the first reactor 32 is being heated for desorption of refrigerant, the second reactor 34 bed cools from an elevated temperature. As the second reactor 34 cools, the sorbent therein continuously absorbs refrigerant vapor from the refrigerant loop 30. The combined action of the first reactor 32 desorbing or "pushing" refrigerant into the refrigerant loop 30 and the second reactor 34 absorbing or "pulling" refrigerant from the refrigerant loop 30 drives the refrigerant around the refrigerant loop 30 without the need for a mechanical compressor.

The refrigerant vapor that is desorbed by the first reactor 32 is first condensed in the condenser 36 and then vaporized in the evaporator 40. Finally, the refrigerant vapor is absorbed by the second reactor 34. A flow device such as an expansion valve 38 is disposed between the condenser 36 and the evaporator 40 to lower the pressure of the liquid refrigerant which enters the evaporator 40 in order to change the saturation point of the refrigerant. The evaporator 40 is piped by path 68 to deliver cooled heat transfer fluid to the heat exchanger 20 during the air conditioning mode. The cooling energy generated by the circulation of the refrigerant through the evaporator 40 during the cooling mode is used to cool the heat transfer fluid circulating in the path 68 connecting the evaporator 40 and the heat exchanger 20. The path 68 includes a pump 70 which drives the heat transfer fluid through the path. In addition, the path 68 includes a check valve 72 which is disposed to interrupt or shut off the path 68 during the heating mode.

To further improve the performance and efficiency of the sorber cooling system, the system preferably includes a subcooler 66 disposed in the refrigerant loop for exchanging thermal energy between the warmer liquid refrigerant directed to the evaporator and the cooler refrigerant vapor leaving the evaporator, thereby lowering the temperature of the refrigerant before it enters the evaporator and warming the refrigerant before it reaches the adsorbing reactor. In addition the sorber cooling system preferably includes a refrigerant reservoir 74 for storing any extra refrigerant that is needed for the operation of the system.

The absorption of refrigerant from the refrigerant loop 30 by the adsorbing reactor produces heat. In order to improve the performance of the system, the system includes a secondary refrigerant loop which recirculates a portion of the refrigerant from the refrigerant loop through the cooling reactor in order to remove this heat. More specifically, the preferred apparatus uses a portion of the condensed refrigerant for cooling the adsorbing reactor. Thus, in operation of the system, condensed refrigerant is directed to a heat transfer section of a reactor in which the desorption cycle is terminated and in which the adsorption cycle is to begin. Tubes or pipes in the reactor heat transfer section are in heat transfer communication with the sorbent. Condensed refrigerant directed into the heat transfer tubes becomes evaporated thereby cooling the tubes, which in turn cool the sorbent to near ambient whereby the sorbent vapor pressure drops below evaporator pressure. The resulting low pressure draws refrigerant vapor into the reactor from the evaporator and absorption begins.

As shown in FIGS. 3 and 4, the sorber cooling system is provided with a recirculation control valve 78 downstream in the refrigerant loop from the condenser 36 which controls the recirculation of refrigerant through a secondary refrigerant loop 80 that includes both reactors. As shown in FIG. 3, during the cooling mode cycle where the first reactor is being heated, a portion of the refrigerant circulating in the refrigerant loop is diverted to the secondary refrigerant loop 80 via the control valve 78 and through line 88 to the second reactor 34. In order to allow for the passage of the recirculated refrigerant, each of the reactors 32, 34 can be equipped with passages 86, 88 for the circulation of refrigerant. The recirculated refrigerant that flows via line 84 and through passage 88 in the second reactor 34 absorbs heat from the sorbent material thereby ensuring that the reactor cools properly, and thus absorbs refrigerant more efficiently. Examples of reactor heat transfer reactions are described in aforesaid U.S. Pat. Nos. 5,441,716 and 5,447,706. The operation with the system components and methods for directing and using a portion of the condensed refrigerant for cooling an adsorbing reactor is also described in U.S. Pat. No. 5,447,706. As an alternative to using condensed refrigerant for cooling the adsorbing reactor, the apparatus and system may instead use a heat transfer fluid or coolant having a phase change from liquid to gas at or below the temperature of the adsorbing reactor, also as described in U.S. Pat. No. 5,447,706. The apparatus and methods of operation of both of the aforesaid alternatives shown and described in U.S. Pat. No. 5,447,7096 are incorporated herein by reference. Other methods for removing heat from the adsorbing reactor may also be used, including removing heat via convection by forcing air flow across the reactor.

After the half-cycle illustrated in FIG. 3 has run for the predetermined interval, the half-cycle of the cooling mode is then initiated by temperature shifting the two reactors. This is accomplished by directing the flow of heated heat transfer fluid from the heater 54 via the valve assembly 65 through the third heat transfer fluid path 62 which interconnects the heater 54 and the second reactor 34, as shown in FIG. 4. The temperature shifting of the beds reverses the roles of the first and second reactors 32, 34. Thus, as the second reactor 34 heats it desorbs refrigerant vapor into the refrigerant loop 30 and as the first reactor 32 cools it absorbs refrigerant vapor from the refrigerant loop 30. During this half-cycle check valves 44 and 46 are open and check valves 42 and 48 are closed. As with the half-cycle illustrated in FIG. 3, heat transfer fluid is circulated between the evaporator 40 and the heat exchanger 20 via the secondary heat transfer fluid path 68 in order to enable the heat exchanger 20 to supply cool air to the passenger compartment 12 of the vehicle. In addition, as with the half cycle illustrated in FIG. 3 and described above, a portion of the refrigerant in the primary refrigerant loop 30 can be recirculated through the refrigerant passage 86 in the first reactor 34 by directing refrigerant through line 82 via the control valve 78.

Figure 5:
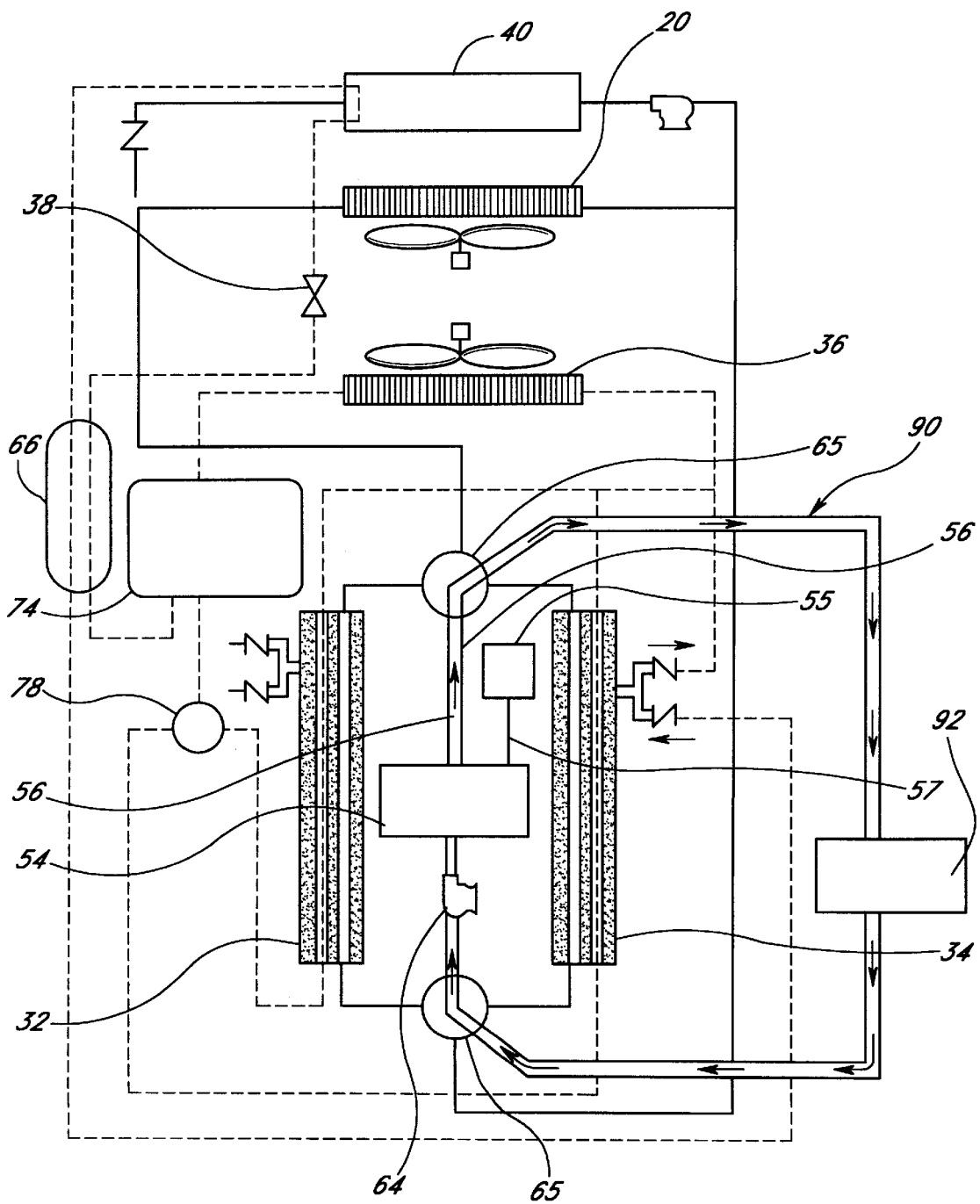
FIG. 5 is a schematic illustration of the two sorber auxiliary active heating and air conditioning system of the present invention operating to preheat the engine.

In a further embodiment of the present invention, the auxiliary heating and air conditioning system can be used to preheat the engine of the motor vehicle. As schematically illustrated in FIG. 5, the valve means 65 includes an engine preheat mode wherein the heated heat transfer fluid from the heater 54 is directed through a fourth path 90 in the heat transfer fluid circulatory system which interconnects the fuel fired heater 54 with the coolant system 92 of the engine of the vehicle.

Figure 6:
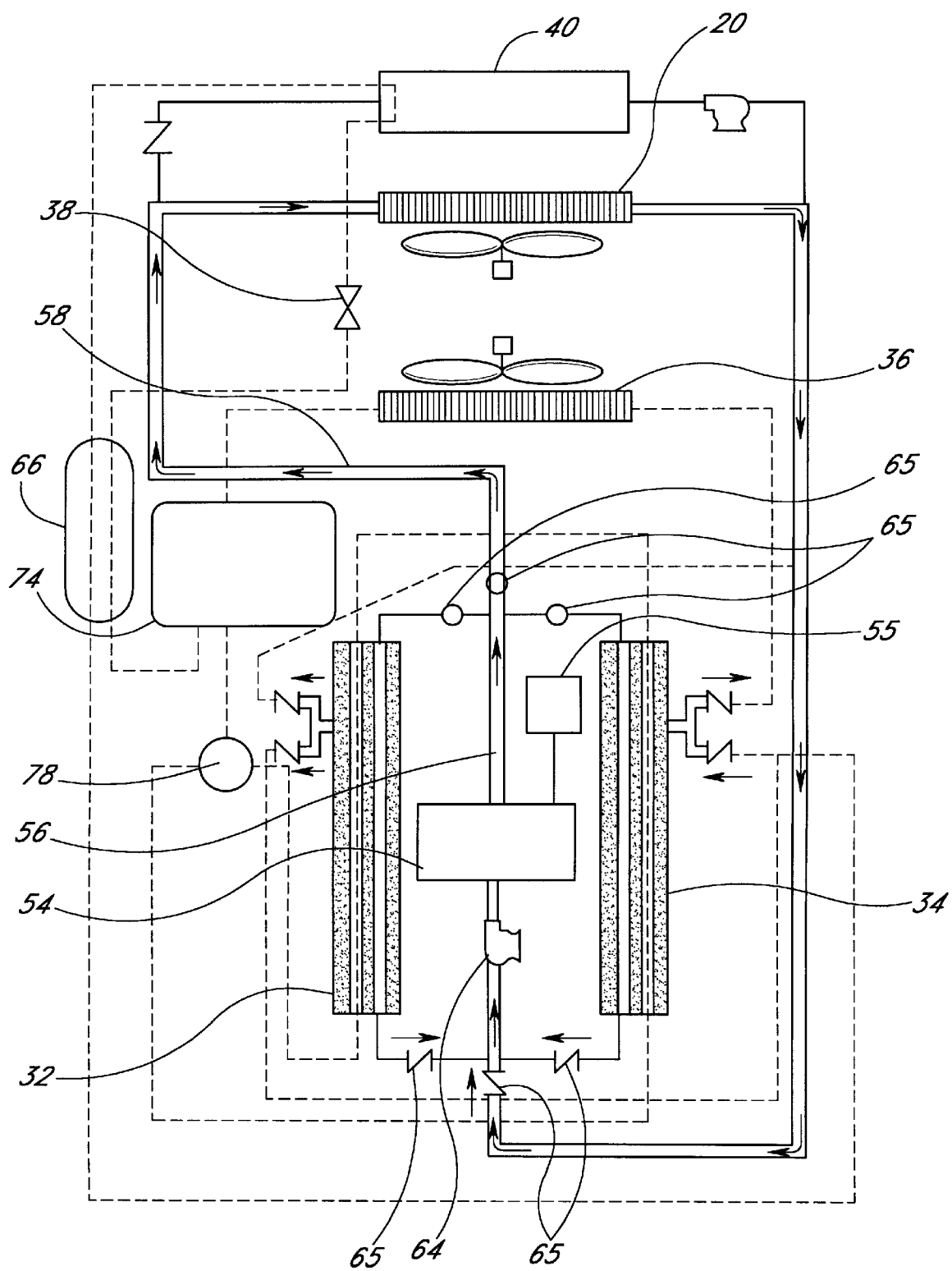
FIG. 6 is a schematic illustration of the two sorber auxiliary active heating and air conditioning system of the present invention showing an alternative embodiment of the valve in the heating mode.

As can be understood from the foregoing, those skilled in the art will appreciate that the valve assembly 65 is not limited to the illustrated multi-directional valves at the inlet and the outlet of the fuel fired heater 54. For example, the valve assembly 65 could comprise at least three separate control valves with at least one valve being located in each of the three fluid paths 58, 60, 62 such that they could direct the flow of the heated heat transfer fluid from the heater 54 into the appropriate paths as shown schematically in FIG. 6 (illustrating the heating mode). In addition, check valves could be provided in each of the heat transfer fluid paths adjacent the point they reenter the heater in order to interrupt the backflow of heat transfer fluid into the appropriate paths when they are not being used.

Figure 7:
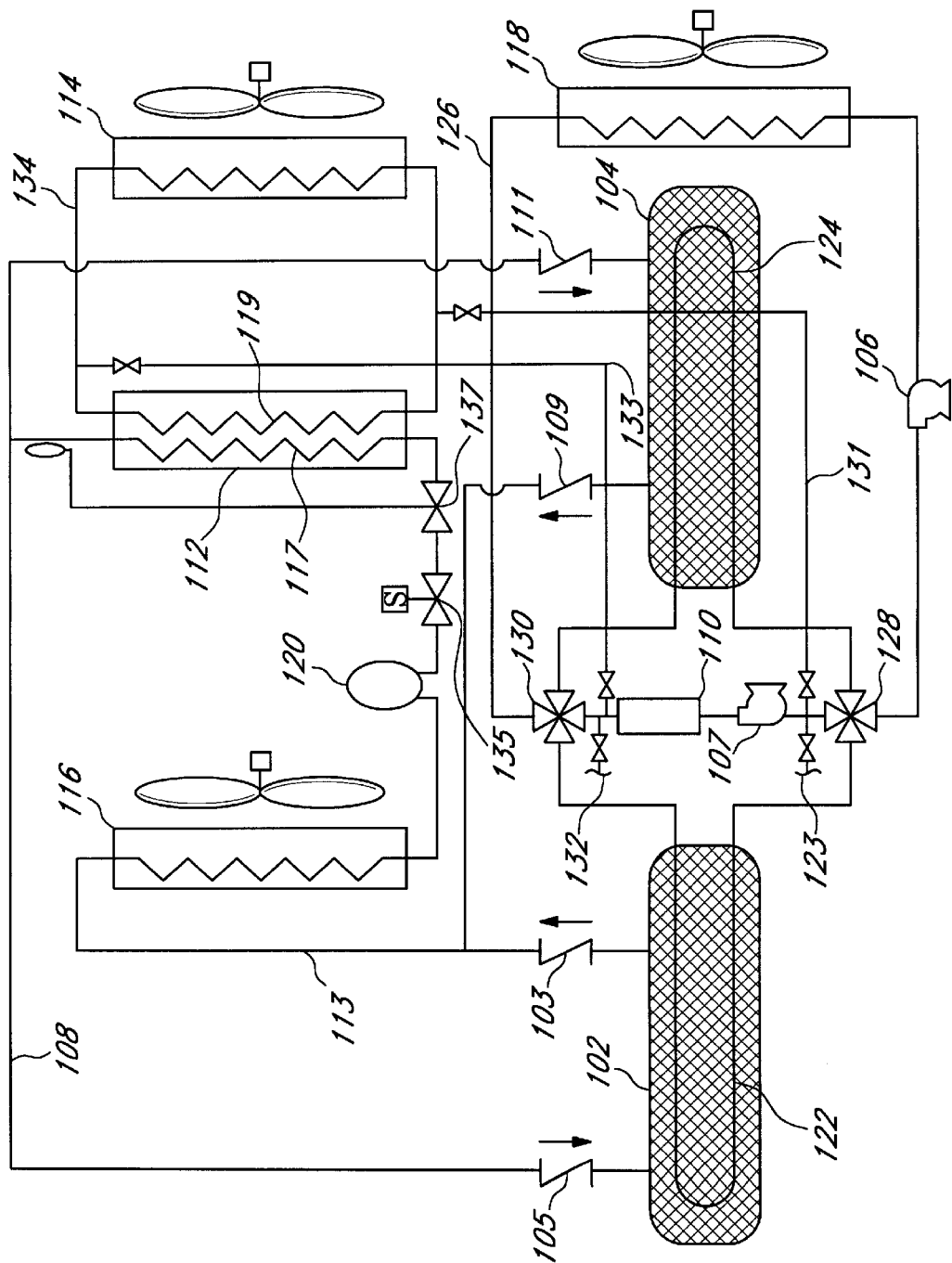
FIG. 7 illustrates an alternative embodiment of the two sorber system of the invention using a single heat transfer loop in each sorber to drive desorption and absorption.

FIG. 7 illustrates an alternative embodiment of a two-sorber system of invention using a separate heat transfer loop for directing a heat transfer fluid through each of the reactors for driving desorption and absorption. The system shown includes an inside heat exchange coil 114 located inside the passenger area of a motor vehicle and a condenser 116 is located outside of the passenger area. An evaporator 112, also located outside the passenger area, transfers thermal energy between refrigerant coil 117 and heat transfer fluid coil 119. A reservoir 120 holds condensed refrigerant (ammonia or other polar gas refrigerant) from condenser 116. A hydronic fluid loop 134, which may include a pump (not shown), directs heat transfer fluid, such as ethylene glycol-water, propylene glycol-water or other suitable fluid between heat exchanger 112 and indoor coil 114. Reactors 102 and 104 each have a heat transfer loop 122 and 124, respectively, through which heated heat transfer fluid is routed for heating the sorbent for driving off refrigerant during desorption and through which cooled heat transfer fluid is directed for initiating and sustaining absorption during which the heat of absorption is rejected. The heat transfer loops are provided with four-way valves 128 and 130 for switching the routing of the fluid for the respective desorption and absorption functions. For example, heated heat transfer fluid from fuel fired heater 110 is directed via heat transfer loop 122 through the heat transfer section of reactor 102 for desorbing the refrigerant from the complex compound while, at the same time, heat transfer fluid cooled through outdoor coil 118 cools the sorbent in reactor 104 to initiate absorption with the continued flow of cooled heat transfer fluid rejecting the heat of absorption in the reactor during the absorption cycle. Pumps 106 and 107 cooperate with the heat transfer fluid loop 126. Refrigerant loop 113 directs refrigerant vapor from the desorbing reactor to condenser 116 and therefrom to reservoir 120. The system shown also includes a number of valves which are selectively operated for directing heat transfer fluid between the heat transfer fluid loop 126 and hydronic fluid loop 134. Thus, a common glycol-water engine antifreeze heat transfer fluid may be conveniently used in the system. In a cooling mode, condensed refrigerant from reservoir 120 is vaporized in evaporator 112 and the cooling produced is transferred the indoor coil 114 via hydronic loop 134. Evaporated refrigerant is directed to an adsorbing reactor via conduit 108. One-way valves 103, 105, 109 and 111 cooperate with the refrigerant loop and conduits for directing vaporized refrigerant to and from the respective reactors. In the embodiment illustrated, multiple two-way valves may be substituted for the four-way valves shown. The refrigerant loop also includes solenoid valve 135 and thermal expansion value (TXV) 137 along the refrigerant loop between reservoir 120 and evaporator 112. For heating the passenger area of the vehicle i.e., a truck sleeper cabin, heat transfer fluid from the fuel-fired heater 110 is circulated via conduits 131 and 133 to and from the indoor coil 114. Optional connections 132, 123 are also provided for engine preheating with heat transfer fluid from the fuel-fired heater 110. The heater may be fueled by diesel fuel, gasoline, propane, natural gas, etc. Alternatively, electrical heating may be used.

In order to facilitate the installation, repair, and replacement, any of the heating and air conditioning systems of the present invention can have a modular design. For example, the sorber cooling system and the fuel fired heater 54 shown in FIGS. 2–4 are located in an auxiliary heating and air conditioning module 96 that is mounted on the exterior of the vehicle as shown in FIG. 1. The module 96 is interconnected with the heat exchanger 20 in the passenger compartment 12 via the primary and secondary heat transfer fluid circulatory systems. As also shown in FIG. 1, the module 96 can be substantially in the form of a rectangular enclosure which can be easily mounted to the frame of the tractor-trailer vehicle 10 just behind the sleeper area 16 of the cab. If the system is designed with the characteristics given in the example described above, the system can be contained in a module that is no larger than 5 cubic feet. In addition to the position shown in FIG. 1, the module 96 could also be located just behind the sleeper area 16 on the opposite side of the frame or it could be mounted to the exterior of the rear wall of the passenger compartment 12.

Since the heating and air conditioning system is located primarily outside of the passenger compartment 12 of the vehicle, the system can be accessed for repairs quite easily without having to enter the vehicle or open the engine compartment. The modular design and the exterior location also make it easier to retrofit existing trucks with the system since space does not have to be made within the passenger or engine compartments. Similarly, the modular design of the system makes the system easy to replace with another system when the system must be repaired. Moreover, as opposed to auxiliary heating and air conditioning systems that have significant components connected to the engine, connected to the primary air conditioning system, or located in the engine compartment, the exterior location of the module 96 avoids the possibility of any interference with the normal operation of the vehicle.

What is claimed is:

1. An auxiliary active heating and air conditioning system for a passenger area of a motor vehicle comprising:

a heat exchanger in the passenger area piped to receive conditioned heat transfer fluid, a sorption cooling system located outside the passenger area and having first and second reactors, each reactor comprising heat exchange surfaces having space therebetween containing a metal salt or a complex compound formed by absorbing a polar gas on a metal salt, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide, said reactors having a heat transfer section for thermally exposing a heat transfer fluid and/or condensed polar gas refrigerant in heat exchange communication with said metal salt or said complex compound, and a refrigerant loop including an evaporator piped to deliver conditioned heat transfer fluid to the heat exchanger during air conditioning;

a fuel fired heater outside the passenger area for heating heat transfer fluid, and a valve assembly comprising one or more valves for directing heat transfer fluid heated by the fuel fired heater and having a plurality of modes including a heating mode wherein heated heat transfer fluid is directed to the heat exchanger, and a cooling mode wherein heated heat transfer fluid is directed to the reactors.

2. A system of claim 1 wherein each said reactor has the space between at least a portion of the heat exchange surfaces substantially filled with a sorbent/substrate composition comprising a substrate material inert to said polar gas and incorporating said salt or mixtures of two or more thereof or said complex compound.

3. A system of claim 2 wherein said substrate material has a porosity of between about 50% and about 98% prior to incorporating said metal salt.

4. A system of claim 2 wherein said substrate material comprises yarn, rope, felt or fabric.

5. A system of claim 3 wherein said substrate material comprises yarn, rope, felt or fabric.

6. A system of claim 2 wherein said metal salt or complex compound comprises at least 50%, by volume, of said sorbent/substrate composition.

7. A system of claim 2 wherein said metal salt or complex compound comprises at least 70%, by volume, of said sorbent/substrate composition.

8. A system of claim 2 wherein said metal salt or complex compound comprises at least 85%, by volume, of said sorbent/substrate composition.

9. A system of claim 3 wherein said substrate material is a woven material.

10. A system of claim 2 in which the polar gas is ammonia.

11. A system of claim 2 in which the polar gas is water, an amine, an alcohol or ammonia.

12. A system of claim 2 in which the salt is a mixture of alkali, alkaline earth, or transition metal salts.

13. A system of claim 2 comprising a finned tube or plate heat exchanger.

14. A system of claim 2 having a mean mass diffusion path length of 15 mm or less.

15. A system of claim 2 having a thermal diffusion path length of 4 mm or less.

16. A system of claim 2 in which the substrate material comprises glass fiber.

17. A system of claim 2 in which the substrate material comprises polyphenylene sulfide.

18. A system of claim 2 in which the substrate material comprises aromatic polyamide or nylon.

19. A system of claim 5 in which the substrate material comprises glass fiber.

20. A system of claim 5 in which the substrate material comprises polyphenylene sulfide.

21. A system of claim 5 in which the substrate material comprises aromatic polyamide or nylon.

22. A system of claim 1 wherein the motor vehicle has an engine cooling system piped to receive heat transfer fluid and the valve means further includes an engine preheating mode wherein heat transfer fluid from the fuel fired heater is directed to the motor vehicle engine cooling system.

23. A system of claim 1 wherein the sorber cooling system and the fuel fired heater are disposed in an auxiliary heating and air conditioning module mounted to the exterior of the motor vehicle.

24. A system of claim 1 wherein the heater is fired by diesel fuel.

25. A system of claim 1 wherein the heater is propane fired.

26. A system of claim 1 wherein the heater is gasoline fired.

27. A system of claim 1 wherein the refrigerant loop includes a secondary refrigerant path for directing condensed polar gas refrigerant through the heat transfer section of an adsorbing reactor for removing heat therefrom.

28. A system of claim 1 wherein the fuel-fired heater and the sorber beds are capable of providing the passenger compartment with at least 2000 Btu/hr of air conditioning energy and more than 4000 Btu/hr of heating energy.

29. A system of claim 28 wherein said polar refrigerant is ammonia, the heat transfer fluid is engine coolant and the heater has sufficient thermal capacity to heat the heat transfer fluid to approximately 270° F. and produce at least 7500 BTU/hr of heating energy.

30. A system of claim 29 wherein the fuel fired heater and the reactor cooling system including the two reactors are disposed in an enclosure mounted to the frame of the motor vehicle.

31. A system of claim 1 wherein the valve means includes a single controllable multi-directional valve for directing the heat transfer fluid heated by the fuel fired heater.

32. A system of claim 31 wherein the valve means further includes a valve for interrupting the backflow of heat transfer fluid to the reactors in the heating mode and to the heat exchanger and the adsorbing reactor bed in the cooling mode.

33. An auxiliary active heating and air conditioning system for a passenger area of a motor vehicle comprising:
a heat exchanger in the passenger area including a passage for circulating heat transfer fluid,
a sorption cooling system located in an auxiliary heating and air conditioning module mounted to the exterior of the motor vehicle and having a refrigerant loop including an evaporator piped to deliver heat transfer fluid to the heat exchanger during cooling, and first and second reactors each containing a metal salt or a complex compound formed by absorbing a polar gas refrigerant on a metal salt, and in which said polar gas is alternately absorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride, or a double metal halide, and wherein said complex compound in said reactors is formed by restricting the volumetric expansion thereof during said absorption of said polar gas refrigerant on said metal salt, said reactors each having a heat transfer section for thermally exposing a heat transfer fluid and/or condensed polar gas refrigerant in heat exchange communication with said metal salt or said complex compound,
a fuel fired heater,
a heat transfer fluid circulatory system which selectively circulates heated heat transfer fluid from the fuel fired heater to either the heat exchanger, the first reactor, or the second reactor, and
a valve assembly comprising one or more valves for directing the heated heat transfer fluid from the fuel fired heater through the heat exchanger in a heating mode, and from the fuel fired heater to the heat transfer section of said reactors for driving desorption therein in a cooling mode.

34. A system of claim 33 wherein the motor vehicle has an engine cooling system interconnected with the heat transfer fluid circulatory system and wherein the valve assembly includes an engine preheating mode in which the heat transfer fluid from the fuel fired heater is directed to the motor vehicle engine cooling system.

35. A system of claim 33 wherein piping between the evaporator and the heat exchanger includes a check valve for interrupting the fluid flow therein during the heating mode.

36. A system of claim 33 wherein the refrigerant loop includes a secondary refrigerant path for directing condensed polar gas refrigerant through the heat transfer section of the absorbing reactor for removing heat therefrom.

37. A system of claim 34 wherein each said reactor comprises one or more reaction chambers substantially filled with a sorbent/substrate composition comprising a substrate material inert to said polar gas and incorporating said salt or mixtures of two or more thereof, or said complex compound.

38. A system of claim 37 wherein said substrate material comprises yarn, rope, felt or fabric.

39. A system of claim 37 wherein said metal salt or complex compound comprises at least 50%, by volume, of said sorbent/substrate composition.

40. A system of claim 37 having a mean mass diffusion path length of 15 mm or less.

41. A system of claim 37 having a thermal diffusion path length of 4 mm or less.

42. A system of claim 37 in which the substrate material comprises glass fiber.

43. A system of claim 37 in which the substrate material comprises polyphenylene sulfide.

44. A system of claim 37 in which the substrate material comprises aromatic polyamide or nylon.

45. A method of selectively heating and air conditioning a passenger area of a motor vehicle, comprising the steps of:
providing an heating and air conditioning module on the vehicle external of the passenger area containing a multiple reactor sorption cooling system and having a passenger compartment heat exchanger piped to receive conditioned heat transfer fluid from the module, first and second reactors each containing a complex compound formed by absorbing a polar gas refrigerant on a metal salt, and in which said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound in said reactors is formed by restricting the volumetric expansion thereof during said adsorption of said polar gas refrigerant on said metal salt, whereby said complex compound is capable of increased reaction rates in moles of said polar gas adsorbed and/or desorbed per mole of said complex compound per hour at adsorption or desorption times of less than 60 minutes, respectively, as compared to a complex compound formed without restricting the volumetric expansion thereof, said reactors each having a heat transfer section for thermally exposing a heat transfer fluid and/or condensed polar gas refrigerant in heat exchange communication with said complex compound, circulating heat transfer fluid from the module to the heat exchanger for selectively heating or air conditioning the compartment, operating a heater for heating said heat transfer fluid, providing heating of the passenger area by directing heated heat transfer fluid from the heater to the passenger compartment heat exchanger, and providing air conditioning to the passenger compartment by alternately directing heated heat transfer fluid from the heater to one of said reactors to desorb said polar gas refrigerant therefrom, condensing said desorbed polar gas refrigerant and evaporating condensed polar gas refrigerant.

46. A method of claim 45 wherein said complex compound is placed in said reactors by incorporating said metal salt in a substrate material and absorbing said polar gas refrigerant on said metal salt to form said complex compound.

47. A method of claim 40 wherein said metal salt is incorporated in said substrate material to form a sorbent/substrate composition and said sorbent/substrate composition is installed in said reactors prior to absorbing said polar gas refrigerant on said metal salt.

* * * * *